Patented Dec. 15, 1925.

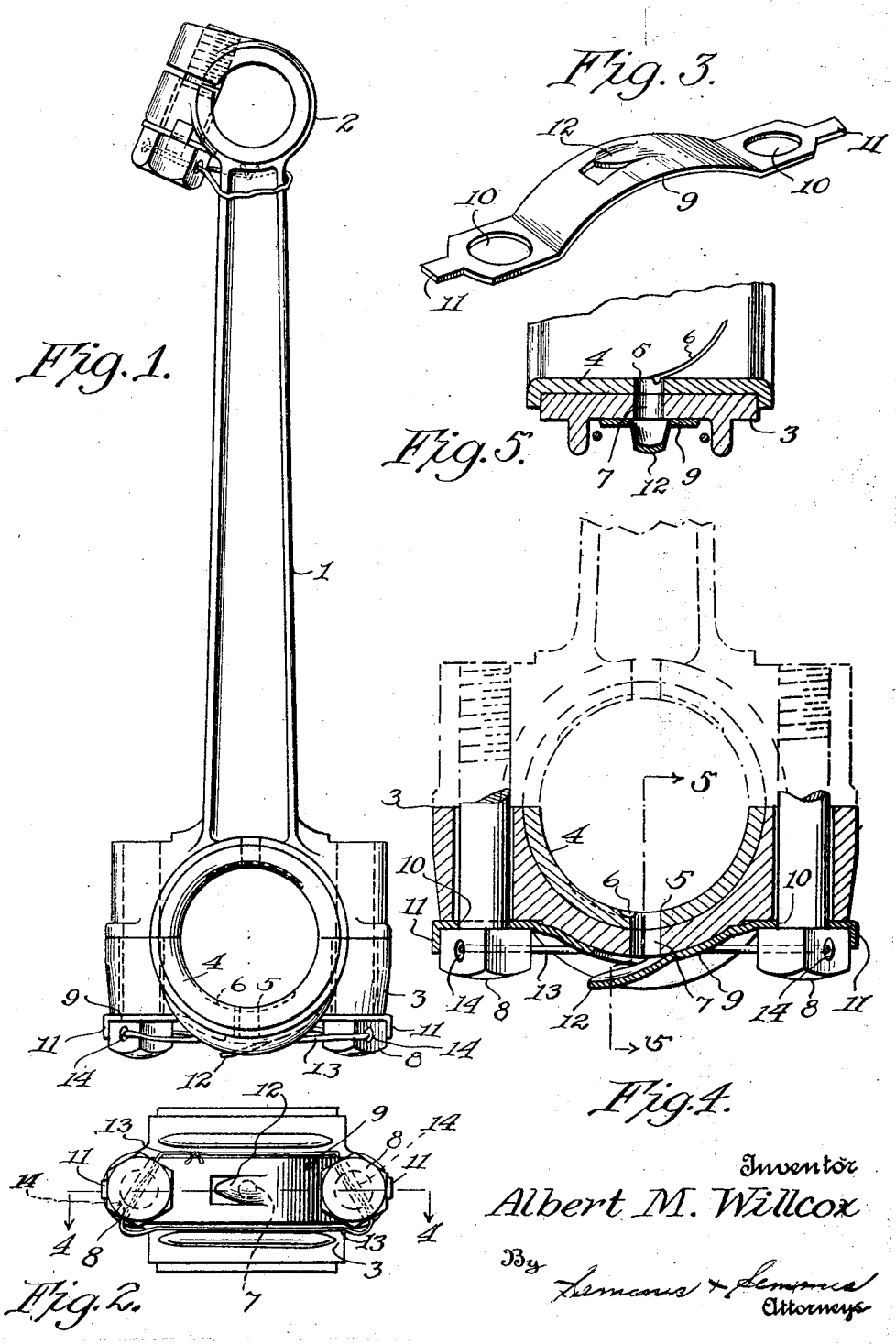

1,566,242

UNITED STATES PATENT OFFICE.

ALBERT M. WILLCOX, OF SAVANNAH, GEORGIA.

CONNECTING ROD.

Application filed November 20, 1924. Serial No. 751,106.

*To all whom it may concern:*

Be it known that ALBERT M. WILLCOX, a citizen of the United States, residing at Savannah, in the county of Chatham and State of Georgia, has invented certain new and useful Improvements in Connecting Rods, of which the following is a specification.

This invention relates to connecting rods and lubricating devices, therefor. The lubricating device is of the splash type or system.

The object of the invention is to provide an effective means for feeding oil to bearings, in such a manner that the supply will be uniformly and equally distributed.

Another object of the invention is to provide a lubricating device of the splash type, the same being designed for application to and for use in connection with crank shafts or connecting rods, and when so applied will produce a two-fold function as will hereinafter appear.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification,

Figure 1 represents a side elevation of a connecting rod showing the application of my device;

Fig. 2 is a bottom plan view;

Fig. 3 is a perspective view of the device;

Fig. 4 is a sectional view taken on line 4—4 of Fig. 2; and

Fig. 5 is a sectional view taken on line 5—5 of Fig. 4.

In the drawings, 1 represents a connecting rod, which may be constructed in any desired or preferred form, having at one end the usual wrist pin connection 2 adapted for the reception of a wrist pin, not shown. The other end of the rod is provided with a split bearing 3 of the usual and preferred type adaptable for adjustment to a crank shaft not shown. The bearing 3 is provided with a split bushing 4 having oppositely disposed apertures 5, and 5', and diagonally transverse oil ducts 6, and 6'. The apertures 5 and 5' registering with alike apertures 7 and 7' drilled in the bearing 3.

The split bearing 3 is assembled and secured together by means of oppositely disposed bolts or studs 8 passed through apertures in the cap and threaded into the other half of the bearing 3. These bolts or studs support a plate 9 which is pressed or otherwise shaped to conform to the outer circumference of the connecting rod bearing cap. The oppositely disposed ends of the plate are provided with alike apertures 10 through which the bolts or studs 8 pass, and thereby clamps said plate in a rigid position. The extreme ends of the plate are formed with lugs 11 adapted to be bent so as to form a flange lock for a nut or stud as the case may be. The plate 9 is further provided with a tongue 12 stamped or otherwise formed in the center of the plate in such a position that the base of the tongue will register with the aperture 7. By virtue of the rotary movement of the bearing and the plate 9 carried thereby, the tongue 12 will dip and force lubricant up through the apertures and oil duct.

As an auxiliary means of locking the studs or nuts 8, I employ a wire 13 which is passed through apertures 14 in said studs and twisted together. While this forms an efficient locking device, it is by no means essential in connection with my device.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various fea- tures of my invention, what I claim as new and desire to secure by Letters Patent is:

1. In a connecting rod, a split bearing, studs for securing the bearing together, a plate mounted upon the studs, means carried by the plate for locking the studs in a fixed position, a tongue in the center of the plate, the base of the tongue registering with an aperture in the bearing.

2. In a connecting rod, a split bearing, a split bushing having its respective members secured in the base and the cap of the bearing, studs threaded in the base of the bearing, the cap of the bearing mounted upon the studs, a plate mounted upon the studs over the cap, an aperture in the cap and its bushing, a tongue stamped in the plate, the base of the tongue registering with the aperture.

3. In a connecting rod, a split bearing, studs for securing the bearings together, an aperture in the bearing, a plate having a tongue stamped from the body thereof, the base of the tongue registering with the aperture in the bearing, an aperture in each end of the plate for engaging the studs, and a lug adjacent to each aperture for locking the studs.

4. In a connecting rod, a split bearing, an aperture in the bearing cap, a plate made to conform to the bearing cap, a tongue in the body of the plate, the base of the tongue registering with the aperture in the cap, an aperture in each end of the plate, and lugs formed at the extreme ends of the plate.

5. In a connecting rod, a bearing cap, an aperture in the bearing cap, a plate adaptable for conformity with a bearing cap, a tongue in the body of the plate, the base of the tongue registering with the aperture in the cap, means for securing the plate over the bearing cap, and means carried by the plate for locking the bearing cap studs.

6. In a lubricating device, a plate adaptable for conformity with a bearing cap, a tongue stamped in the body of the plate, the base of the tongue registering with an aperture in the bearing cap, means for securing the plate in position, and means carried by the plate for locking the bearing cap studs in position.

7. In a lubricating device, a plate made to conform with the outer circumference of a bearing cap, a tongue formed in the body of the plate, the base of the tongue registering with an aperture in the bearing cap, apertures in the ends of the plates adapted to be engaged by the bearing cap studs, and lugs formed at each end of the plate adapted to engage the head of the studs.

8. In a lubricating device, a plate adaptable for conformity with a bearing cap, a tongue stamped from the body of the plate, the base of the tongue registering with an aperture in the bearing cap, means for securing the plate in position by the bearing cap studs, and means carried by the plate for locking the bearing cap studs.

9. In a lubricating device of the splash type, in combination with a bearing cap having an aperture therein communicating with an oil duct in the bearing, a plate made to conform with the outer wall of the bearing cap, said plate having a aperture in each end thereof adapted to register with apertures in the bearing cap and to be engaged by the bearing cap studs, lugs formed upon the respective ends of the said plate, said lugs adapted to be bent up so as to lock said studs, a tongue stamped in the body of the plate, the base of said tongue registering with the aperture in the bearing cap which communicates with the oil duct.

10. In a lubricating device of the splash type, in combination with a bearing cap, a plate made to conform with said bearing cap, a tongue carried by said plate, the base of said tongue registering with an aperture in the bearing cap, apertures in the ends of the plate adapted to be engaged by the bearing cap studs, a lug formed upon each end of the plate adapted to be bent up against the heads of the bearing cap studs, and an auxiliary means for locking said studs.

In testimony whereof I affix my signature.

ALBERT M. WILLCOX.